United States Patent [19]
Gochman et al.

[11] Patent Number: 5,928,352
[45] Date of Patent: *Jul. 27, 1999

[54] METHOD AND APPARATUS FOR IMPLEMENTING A FULLY-ASSOCIATIVE TRANSLATION LOOK-ASIDE BUFFER HAVING A VARIABLE NUMBERS OF BITS REPRESENTING A VIRTUAL ADDRESS ENTRY

[75] Inventors: Simcha Gochman, Timrat; Jacob Doweck, Haifa, both of Israel

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,355

[22] Filed: Sep. 16, 1996

[51] Int. Cl.$^6$ .............................. G06F 12/10; G06F 12/12
[52] U.S. Cl. ......................... 712/200; 711/200; 711/202; 711/203; 711/206; 711/207
[58] Field of Search ...................................... 395/375, 412, 395/413, 414, 415, 416, 417, 403; 711/3, 122, 128, 133, 200, 136, 202–210

[56] References Cited

U.S. PATENT DOCUMENTS

| | | | |
|---|---|---|---|
| 5,226,133 | 7/1993 | Taylor et al. | 711/207 |
| 5,249,286 | 9/1993 | Alpert et al. | 711/125 |
| 5,263,140 | 11/1993 | Riordan | 711/207 |
| 5,307,477 | 4/1994 | Taylor et al. | 711/3 |
| 5,426,750 | 6/1995 | Becker et al. | 711/207 |
| 5,586,283 | 12/1996 | Lopez-Aguado et al. | 711/207 |
| 5,606,683 | 2/1997 | Riordan | 711/207 |
| 5,668,968 | 9/1997 | Wu | 711/3 |
| 5,694,567 | 12/1997 | Bourekas et al. | 711/3 |
| 5,712,998 | 1/1998 | Rosen | 711/205 |
| 5,802,341 | 9/1998 | Kline et al. | 711/209 |
| 5,860,147 | 1/1999 | Gochman et al. | 711/207 |

Primary Examiner—Zarni Maung
Assistant Examiner—Bharat Barot
Attorney, Agent, or Firm—Blakely, Sokoloff, Taylor & Zafman

[57] ABSTRACT

Some virtual memory systems allow more that one memory page size. To quickly translate virtual page addresses into physical page addresses, a multi-page size translation look-aside buffer is needed. The multi-page size translation look-aside buffer has a virtual address array and a physical address array. The virtual address array has a set of virtual address entries that are compared to a received virtual address. The virtual address array entries have virtual address tag field, a valid bit, and a page size bit. The page size bit defines the size of the memory page and thus defines the number of bits in the virtual address that must be matched with virtual address tag bits in the virtual address array. The valid bit indicates if the entry is valid or not. When a hit is detected in the virtual address array, a corresponding entry in the physical address array is activated. The physical address array comprises a physical page address and a set of page attributes. The physical address array also has a locked bit and an access bit that are used to implement a translation look-aside buffer replacement scheme.

14 Claims, 2 Drawing Sheets

Figure 1 - Prior Art

METHOD AND APPARATUS FOR IMPLEMENTING A FULLY-ASSOCIATIVE TRANSLATION LOOK-ASIDE BUFFER HAVING A VARIABLE NUMBERS OF BITS REPRESENTING A VIRTUAL ADDRESS ENTRY

1. FIELD OF THE INVENTION

This invention relates to the field of microprocessor architecture. Specifically, the invention relates to a mechanism that implements a translation look-aside buffer for translating virtual addresses into physical addresses.

2. ART BACKGROUND

In recent years, the size of computer programs have outgrown the main memory available in computers. To accommodate very large programs in a limited amount of physical memory, virtual memory was created. Virtual memory defines a large virtual address space that a program is allowed to run in. The virtual memory is divided into blocks of memory known as pages. A subset of the virtual memory pages are mapped onto physical memory pages. To create a large virtual address space, only a limited number of the virtual memory pages are mapped into a short term physical memory such as dynamic RAM. The remainder of the virtual memory pages are mapped onto long term storage such as hard disk drives.

Furthermore, virtual memory simplifies the implementation of multitasking operating systems. Each process in the multitasking system is allocated a limited number of the available physical memory pages. However, each process is given a large virtual address space wherein a subset of the virtual memory pages are mapped onto the allocated physical memory pages. The remainder of the virtual memory pages are mapped to long term storage.

Virtual memory systems are usually implemented with the use of a "page table." A page table is a data structure that is indexed using a virtual page address to retrieve a physical page address. Thus, when a program accesses memory using a virtual address, the operating system or the hardware examines the page table to translate the virtual page address into a physical memory page address. Then, using the physical address, the memory location is accessed.

Page tables are usually stored in main memory. To reduce the time required to perform virtual memory address to physical memory address translations, many computer processors implement a Translation Look-Aside Buffer (TLB). A translation look-aside buffer is a high speed cache that is dedicated to performing translations from virtual memory addresses into physical memory addresses.

Some processors implement virtual memory systems that have more than one size of page. For example, in the Intel Microprocessor Architecture, supports both 4 kilobyte pages and 4 Megabyte pages. It would therefore be desirable to have a fully associative translation look-aside buffer that supports more than one size of memory pages.

SUMMARY OF THE INVENTION

The present invention introduces a translation look-aside buffer for translating virtual page addresses into page addresses where the memory pages can be of different sizes. The translation look-aside buffer has a virtual address array and a physical address array. The virtual address array has a set of virtual address entries that are compared to a received virtual address. The virtual address array entries have virtual address tag field, a valid bit, and a page size bit. The page size bit defines the size of the memory page and thus defines the number of bits in the virtual address that must be matched with virtual address tag bits in the virtual address array. The valid bit indicates if the entry is valid or not. When a hit is detected in the virtual address array, a corresponding entry in the physical address array is activated. The physical address array comprises a physical page address and a set of page attributes.

Other features and advantages of the present invention will be apparent from the accompanying drawings, and from the detailed description that follows below.

BRIEF DESCRIPTION OF THE DRAWINGS

The features and advantages of the present invention will be apparent to one skilled in the art, in view of the following detailed description and drawings in which.

DETAILED DESCRIPTION OF THE INVENTION

Methods and apparatus for implementing a fully associative translation look-aside buffer in a computer processor are disclosed. In the following description, for purposes of explanation, specific nomenclature is set forth to provide a thorough understanding of the present invention. However, it will be apparent to one skilled in the art that these specific details are not required in order to practice the present invention. Well known circuits and devices are shown in block diagram form.

A Prior Translation Look-Aside Buffer

Figure 1:
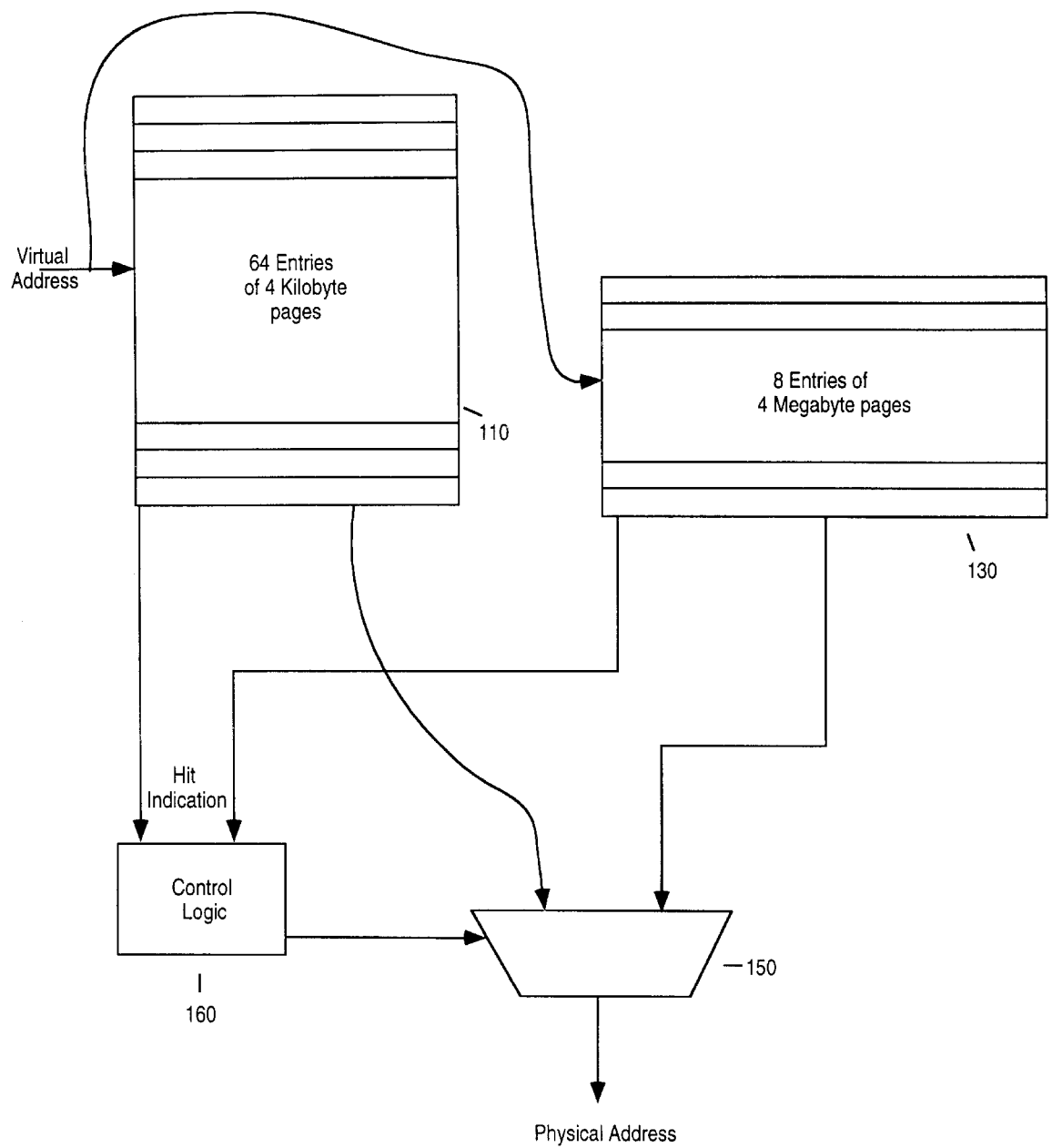
FIG. 1 illustrates a prior art method of implementing a translation look-aside buffer that supports two different sized pages.

FIG. 1 illustrates a block diagram of a translation look-aside buffer arrangement for a processor that uses two different sizes of memory pages. The translation look-aside buffer arrangement of FIG. 1 actually consists of two translation look-aside buffers: a first translation look-aside buffer 110 for four kilobyte (4 Kb) pages and a second translation look-aside buffer 130 for four Megabyte (4 Mb) pages.

To perform a virtual address to physical address translation, the virtual memory address is provided to both the first translation lookaside buffer 110 and the second translation look-aside buffer 130. The physical address (if any) provided by each translation look-aside buffer is routed through a multiplexer 150. The multiplexer 150 is controlled by logic 160 that selects the translation look-aside buffer (110 or 130) that has a hit.

As illustrated in FIG. 1, two complete translation look-aside buffers are used to implement a translation look-aside buffer system that handles different sized pages. The two different translation look-aside buffers may be set-associative to improve the translation time. It would be desirable to simplify the circuitry required to implement such a translation look-aside buffer.

A Fully Associative Translation Look-Aside Buffer

Figure 2:
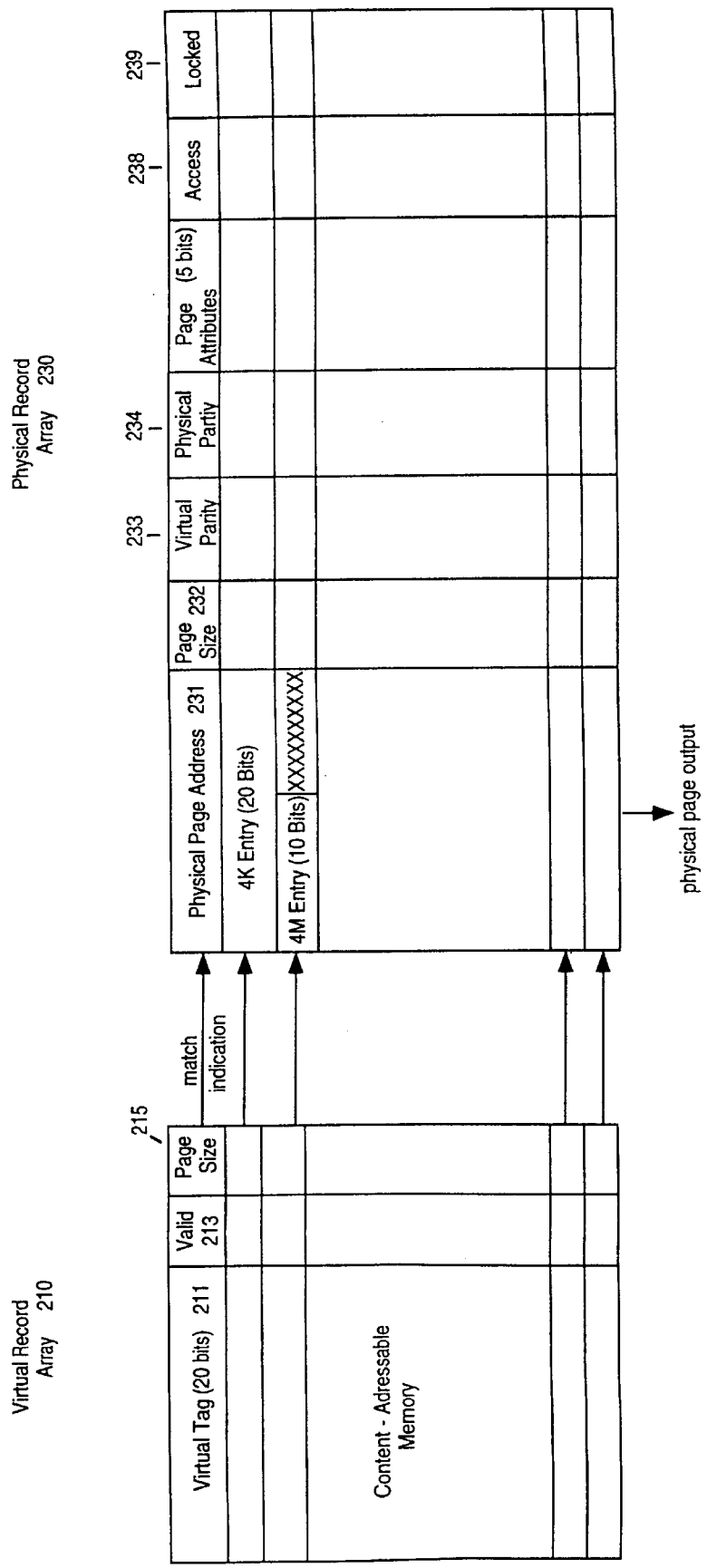
FIG. 2 illustrates a block diagram of the translation lookaside buffer of the present invention.

FIG. 2 illustrates the fully associative Translation Look-Aside Buffer of the present invention. As illustrated in FIG. 2, the Translation Look-Aside Buffer of the present invention comprises two main parts: a virtual memory array 210 and an associated physical address array 230.

The virtual memory array 210 is a specialized content addressable memory (CAM) array that contains a 20 bit virtual address tag 211, a valid bit 213, and a page size flag 215. When a virtual memory address to be translated is applied to the virtual memory array 210, the virtual memory array 210 will test each entry and indicate a "hit" if a virtual address tag in an entry matches the applied virtual memory address and the valid bit 213 indicates that the virtual memory array 210 entry is valid.

When attempting to match the applied virtual memory address, a page size flag 215 is used. The page size flag 215 is used to determine the number of bits that need to be matched for that entry. If the page size flag 215 indicates that an entry is for a four Kilobyte page, then all 20 bits of the virtual tag must be matched. Alternatively, if the page size flag 215 indicates that the entry is for a four Megabyte page, then only the 10 most significant bits must match for a hit. In other embodiments, a larger multi-bit page size field could be used such that additional memory page sizes exist.

When a hit occurs in the virtual memory array 210, the virtual memory array 210 activates a match line that accesses a corresponding row in the physical address array 230. The physical address array 230 consists of a physical page address field 231 and a set of control bits. When a row in the physical address array 230 is activated, the physical address array 230 outputs the physical page address from the physical page address field 231 of the selected row.

When outputting the physical page address, the physical address array 230 also uses a page size flag 232. The page size flag 232 of the physical address array 230 determines how many bits of the physical page address field 231 will be output when a hit occurs. Specifically, if the page size flag 232 indicates that the entry of the physical address array 230 is for a four Kilobyte page, then all 20 bits of the physical page address field 231 are output. Alternatively, if the page size flag 232 indicates that the entry of the physical address array 230 is for a four Megabyte page, then only the 10 most significant bits of the physical address field 231 are output and the 10 least significant bits are bypassed from the virtual address.

The physical address array 230 also includes several other control bits. A set of page attribute bits define the characteristics of the memory page such as whether it is read-only, "dirty" (has been written to), or a supervisor page. A virtual parity bit 233 and a physical parity bit 234 are used to ensure that the virtual and physical addresses are correct. The parity bits are used for error detection. The access bit 238 and the locked bit 239 are used to implement a sophisticated replacement scheme for the translation look-aside buffer. The replacement scheme will be described in detail later in this document.

As illustrated in the translation look-aside buffer of FIG. 2, any virtual address and physical address pair may be placed into any entry of the translation look-aside buffer. Furthermore, each entry in the translation look-aside buffer may be for a different sized page. Thus, the translation look-aside buffer of FIG. 2 efficiently handles all types of virtual address to physical address translations in a single fully associative translation look-aside buffer.

Translation Look-Aside Buffer Replacement System

Once all the entries in a translation look-aside buffer become filled, then new entries must replace older entries. To most efficiently continue virtual address translation, it would be desirable to replace a translation look-aside buffer entry that will not be needed again. A good approximation of this is to select the entry that was least recently used. However, it is very difficult to implement a fast least-recently-used replacement circuit. Thus, many caches and translation look-aside buffer implement pseudo-least-recently-used replacement systems.

To implement a pseudo-least-recently-used replacement system, an access bit 238 is provided for each entry in the physical address array 230. Each time an entry in the physical address array 230 is accessed, the access bit 238 for that entry is set. When a translation look-aside buffer entry must be replaced, the translation look-aside buffer replacement logic selects a translation look-aside buffer entry that does not have the access bit 238 set.

When there is only one translation look-aside buffer entry with a clear access bit and setting that entry's access bit 238 would result in having all then access bits set, then all the other access bits in the translation look-aside buffer are cleared and only the access bit for that one entry is set. This ensures that there is always an entry that can be replaced.

Many of the current generation microprocessors operate by decoding architectural level instructions into internal microinstructions. Some simple architectural level instructions can be implemented with a single internal microinstruction. However, other complex architectural level instructions require full software routines consisting of several microinstructions.

When a microinstruction routine implementing a single architectural level instruction that will use the translation look-aside buffer begins executing, the contents of a translation look-aside buffer entry must remain consistent for the microinstruction routine to execute properly. Specifically, the translation look-aside buffer entry must not change until the full microinstruction routine that executes the instruction completes. To keep the value of a translation look-aside buffer entry consistent during a microinstruction routine, the present invention introduces a locked bit 239 in each translation look-aside buffer entry. The locked bit 239 works in conjunction with the access bits such that when an entry needs to be replaced, the least recently used entry that is not locked will be replaced.

Referring to FIG. 2, each entry in the physical address array 230 of the translation look-aside buffer includes an access bit 238 and a locked bit 239. When a microinstruction routine accesses an entry in the physical address array 230, the locked bit 239 for that entry of the physical address array 230 is set. When the locked bit 239 for an entry of the physical address array 230 is set then that entry will not be replaced. After the microinstruction routine completes execution, then the locked bit 239 that was set is cleared such that the entry can be replaced.

The access bit 238 of a TLB entry is set when a lookup hits that particular TLB entry. A access bit 238 is cleared when that TLB entry is invalidated. All of the access bits in the TLB are cleared if one of the two following conditions occur:

1. The Translation Look-Aside Buffer (TLB) is flushed; or
2. $(A_0+L_0) \wedge (A_1+L_1) \wedge (A_2+L_2) \wedge \ldots \wedge (A_n+L_n)=1$ Where $A_i$ represents an access for entry i and $L_i$ represents a locked bit for entry i. The second case that causes all the access bits in the TLB to be clear occurs when there is no TLB entry that can be replaced since all entries have at least the access bit or the locked bit set.

As illustrated above, the present invention combines the functions of the access bits and the functions of the locked bits into a single translation look-aside buffer replacement policy. Specifically, an entry in the translation look-aside buffer can only be replaced if the access bit 238 for the entry is clear and locked bit 239 for the entry is clear. If either the access bit 238 or the locked bit 239 is set, then the entry will not be replaced. To always have at least one TLB entry that can be replaced, all the access bits will be cleared if all entries have either their access bit or their locked bit set.

The foregoing has described methods and apparatus for implementing a fully associative translation look-aside buffer in a computer processor. It is contemplated that changes and modifications may be made by one of ordinary skill in the art, to the materials and arrangements of elements of the present invention without departing from the scope of the invention.

We claim:

1. An apparatus for translating a virtual address into a physical address, said apparatus comprising:
    a virtual address array, said virtual address array comprising a plurality of virtual address array entries wherein each virtual address array entry has a virtual address tag field and a first page size field, said virtual address array fully associative such that any virtual address may be placed in any virtual address array entry; and
    a physical address array, said physical address array comprising a plurality of physical address array entries wherein each physical address array entry is coupled to a corresponding virtual address array entry by a match line, each of said physical address array entry having a physical address field and a locked bit, wherein said locked bit is set when a microinstruction routine accesses said physical address array entry to said locked bit to keep said physical address array entry consistent during said microinstruction routine, said locked bit reset when said microinstruction routine terminates.

2. The apparatus as claimed in claim 1 wherein each entry of said physical address array further comprises a set of page attributes.

3. The apparatus as claimed in claim 1 wherein each entry of said physical address array further comprises an access bit.

4. The apparatus as claimed in claim 1 wherein said virtual address array comprises a content addressable memory.

5. The apparatus as claimed in claim 1 wherein each entry of said physical address array further comprises a second page size field, said second page size bit indicating a size of a memory page.

6. The apparatus as claimed in claim 3 wherein each entry in said physical address array can only be replaced if a locked bit for said entry is clear and an access bit for said entry is clear.

7. A method of translating a virtual address into a physical address, said method comprising the steps of:
    comparing said virtual address to at least one virtual address entry, said step of comparing comprising accessing a page site field in said virtual address entry to obtain a size of a memory page associated with said virtual address entry, and
    comparing a number of bits in said virtual address with a virtual address tag in said virtual address entry, said number of bits compared dependent upon said page size field;
    outputting a corresponding physical address if said number of bits in said virtual address corresponds with said virtual address tag; and
    setting a locked bit set when a microinstruction routine accesses a physical address array entry such that said locked bit keeps said physical address array entry consistent during said microinstruction routine and resetting said locked bit when said microinstruction routine terminates.

8. The method as claimed in claim 7 wherein said step of outputting a corresponding physical address comprises the steps of:
    asserting a match line from said virtual address entry into a line in a physical address array; and
    outputting a physical address field from said line in said physical address array.

9. A method of translating a virtual address into a physical address, said method comprising the steps of:
    matching said virtual address with a virtual address entry;
    setting a locked bit corresponding with said virtual address entry such that said locked bit keeps said physical address array entry consist during said microinstruction routine;
    executing a microinstruction routine; and
    resetting said locked bit in response to termination of said microinstruction routine such that said physical address array entry may be modified after completion of said microinstruction routine.

10. An apparatus for translating a virtual address into a physical address, said apparatus comprising:
    a virtual address array, said virtual address array comprising a plurality of virtual address array entries wherein each virtual address array entry has a virtual address tag field and a first page size field, said virtual address array fully associative such that any virtual address may be placed in any virtual address array entry, said virtual address array entries comprising of two-state content addressable memory; and
    a physical address array, said physical address array comprising a plurality of physical address array entries wherein each physical address array entry is coupled to a corresponding virtual address array entry by a match line, each of said physical address array entry having a physical address field and a locked bit, wherein said locked bit is set when a microinstruction routine accesses said physical address array entry to said locked bit to keep said physical address array entry consistent during microinstruction routine, said locked bit reset when said microinstruction routine terminates, said physical address array entries comprising two-state content addressable memory.

11. The apparatus as claimed in claim 10 wherein each entry of said physical address array further comprises a set of page attributes.

12. The apparatus as claimed in claim 10 wherein each entry of said physical address array further comprises an access bit.

13. The apparatus as claimed in claim 10 wherein each entry of said physical address array further comprises a second page size field, said second page size bit indicating a size of a memory page.

14. The apparatus as claimed in claim 10 wherein each entry in said physical address array can only be replaced if a locked bit for said entry is clear and an access bit for said entry is clear.

* * * * *

UNITED STATES PATENT AND TRADEMARK OFFICE
CERTIFICATE OF CORRECTION

PATENT NO.    : 5,928,352
DATED         : July 27, 1999
INVENTOR(S)   : Gochman et al.

It is certified that error appears in the above-identified patent and that said Letters Patent is hereby corrected as shown below:

Column 5,
Line 43, after "wherein" insert -- each entry of --.
Line 58, delete "site" and insert -- size --.

Column 6,
Line 21, delete "consist" and insert -- consistent --.
Line 48, after "during" insert -- said --.

Signed and Sealed this

Twentieth Day of May, 2003

JAMES E. ROGAN
*Director of the United States Patent and Trademark Office*